(12) United States Patent
Nishimura et al.

(10) Patent No.: US 7,336,494 B2
(45) Date of Patent: Feb. 26, 2008

(54) ELECTRONIC DEVICE HAVING COMPACT HEAT RADIATION STRUCTURE

(75) Inventors: Hideki Nishimura, Kanagawa (JP); Kazuhiro Tomizawa, Tokyo (JP)

(73) Assignees: NEC Infrontia Corporation, Kanagawa (JP); NEC Engineering, Ltd., Tokyo (JP)

(*) Notice: Subject to any disclaimer, the term of this patent is extended or adjusted under 35 U.S.C. 154(b) by 178 days.

(21) Appl. No.: 11/176,283

(22) Filed: Jul. 8, 2005

(65) Prior Publication Data

US 2006/0012963 A1  Jan. 19, 2006

(30) Foreign Application Priority Data

Jul. 15, 2004  (JP)  ............... 2004-208687

(51) Int. Cl.
    *H05K 7/20*  (2006.01)
(52) U.S. Cl. ............ 361/714; 361/681; 361/704; 361/717; 313/46; 313/498; 345/60; 349/58; 349/150
(58) Field of Classification Search ........ 361/687, 361/706, 714, 719, 681; 248/519, 917–924; 24/458; 348/14.07, 522, 552, 789, 794, 836–843; 315/169.1, 169.2, 169.3; 313/46, 493, 44, 313/573, 582, 634, 294, 47, 572, 40, 581, 313/45, 48; 209/409; 445/24, 25
See application file for complete search history.

(56) References Cited

U.S. PATENT DOCUMENTS 6,657,620 B2 * 12/2003 Oishi et al. ............ 345/204
6,688,576 B2 * 2/2004 Oishi et al. ............ 248/317
6,744,186 B2 * 6/2004 Oishi et al. ............ 313/46
6,744,544 B1 * 6/2004 Nagashima et al. ...... 358/518

FOREIGN PATENT DOCUMENTS

| JP | 409044096 A | * | 2/1997 |
| JP | 410116036 A | * | 5/1998 |
| JP | H11-008484 | | 1/1999 |
| JP | 411327449 A | * | 11/1999 |
| JP | 2001-166851 | | 6/2001 |
| KR | 366093 B | * | 12/2002 |

* cited by examiner

*Primary Examiner*—Michael Datskovskiy
(74) *Attorney, Agent, or Firm*—Dickstein Shapiro LLP

(57) ABSTRACT

A liquid crystal display (LCD) is fixed to an upper housing half by an LCD fixing frame made of a material having a high thermal conductivity. The LCD fixing frame is attached to the upper housing half in contact with a lower surface of the LCD on the opposite side of a display panel which defines an image display plane. A substrate mounted with high heat generating parts such as a CPU is attached to the LCD fixing frame such that the high heat generating parts face the lower surface of the LCD fixing frame. A thermally conductive member is disposed between the high heat generating parts and the LCD fixing frame in contact with the high heat generating parts and LCD fixing frame.

9 Claims, 4 Drawing Sheets

ELECTRONIC DEVICE HAVING COMPACT HEAT RADIATION STRUCTURE

BACKGROUND OF THE INVENTION

1. Field of the Invention

The present invention relates to an electronic device, and more particularly, to a heat radiation structure thereof.

2. Description of the Related Art

In electronic devices, parts, in particular, a CPU, IC's and the like generate heat as they operate. For such high heat generating parts, it is necessary to dissipate the generated heat in order to prevent the heat from adversely affecting the parts themselves and/or surrounding parts.

Conventionally, known structures for dissipating heat from such high heat generating parts have relied on a fan and/or a heat radiation member having a high thermal conductivity disposed in a device. JP-2001-166851-A discloses a heat radiation structure which employs a heat radiation member for conducting heat to the housing of a device to radiate the heat to the outside from the housing. JP-11-8484-A in turn discloses a heat radiation structure which has a heat radiation window formed through the housing of a device for dissipating heat conducted by a heat radiation member.

However, a structure which employs a cooling fan to dissipate heat generated by high heat generating parts causes an increase in the size of a device, in order to accommodate the cooling fan therein, and an increase in power consumption. In particular, portable electronic devices such as a portable information terminal, a notebook-type computer and the like are required to be smaller in size and lighter in weight such that the user can conveniently carry such devices. Also, since some portable electronic devices operate with batteries, such devices are required to reduce power consumption in order to provide a sufficiently long run time when not connected to an external power source. From these requirements, the structure relying on a cooling fan is not particularly suitable especially for portable electronic devices.

On the other hand, in the structure designed to radiate heat from the housing, as described in JP-2001-166851, when the device is placed on a desk, it is possible that heat may be trapped between the desk and the device, thereby resulting in a failure to efficiently radiate the heat. Also, in order to efficiently radiate heat from the housing, the housing is advantageously made of a metal having high heat radiation performance. However, metal housing is disadvantageous over plastic housing in that parts contained therein are more susceptible to damage when the device is dropped, and in that the cost of parts is approximately doubled In regard to a structure which includes a heat radiation member, conventionally, the heat radiation member must be provided exclusively for heat radiation, as disclosed in JP-2001-166851-A and JP-11-8484-A, thereby causing an increase in the size and weight of the device.

SUMMARY OF THE INVENTION

It is an object of the present invention to provide an electronic device having a heat radiation structure which is capable of efficiently dissipating heat generated from high heat generating parts while preventing an increase in the size, weight, and power consumption of the device.

At a minimum, display panel and a high heat generating part are contained in a housing of the electronic device according to the present invention. The housing is formed with an opening through which the display panel is exposed. Then, the electronic device according to the present invention further includes heat conducting means for conducting heat generated by the high heat generating part to the display panel.

According to the electronic device described above, the heat generated by the high heat generating part is conducted to the display panel, and radiated from a surface of the display panel facing the outer surface of the electronic device.

Heat can be efficiently radiated through emission, particularly when the display panel is made of glass.

More specifically, the electronic device according to the present invention may include a display device fixing frame in contact with a surface of a display device, which comprises the display panel, opposite to the display panel for fixing the display device to the housing. In this structure, the high heat generating part is mounted to face a surface of the display device fixing frame opposite to a surface which is in contact with the display device. Then, the display device fixing frame forms the heat conducting means.

As described above, in the electronic device according to the present invention, the display device that is a necessary part of the electronic device, and the display device fixing frame for fixing it, are utilized to dissipate heat generated by the high heat generating part to the outside of the electronic device. It is therefore possible to have a heat radiating mechanism that does not cause an increase in the size and weight of the electronic device. Also, the heat radiating mechanism does not require power consumption which would otherwise be needed when a fan is used to radiate heat.

The heat conducting means can further include a thermally conductive member disposed between the high heat generating part and the display device fixing frame in contact with the high heat generating part and display device fixing frame. The provision of a thermally conductive member facilitates designing a structure in which the heat generated by the high heat generating part can be efficiently conducted toward the display device fixing frame.

A substrate mounted with the high heat generating part is preferably attached to the display device fixing frame and spaced apart from the housing. In this way, heat generated around the substrate escapes toward the housing, so that heating the housing to a high temperature can be suppressed. Also, the high heat generating part can be mounted at a location relatively close to the display device fixing frame, thereby making it possible to increase the efficiency of thermal conduction from the high heat generating part to the display device fixing frame and to employ a smaller thermally conductive member. Instead of using the thermal conductive member, the high heat generating part may be directly in contact with the display device fixing frame.

The display device fixing frame preferably includes a flat plate part which is in contact with an entire surface of the display device opposite to the display panel. In this way, heat from the high heat generating part can be distributed over the entire flat plate part of the highly conductive display device fixing frame so that the heat is uniformly conducted over the entire back surface of the display device, thus making it possible to reduce thermal influence on the display device due to a temperature difference which would otherwise be placed on the display device.

Also, the heat conducting member may further include a heat pipe attached to the display device fixing frame and extending in a direction along the surface of the display device fixing frame in contact with the display device. The addition of the heat pipe can improve the thermal conductivity in a direction along the surface of the display device fixing frame in contact with the display device, and efficiently distribute the heat from the high heat generating part to reduce thermal influence on the display device.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1A:
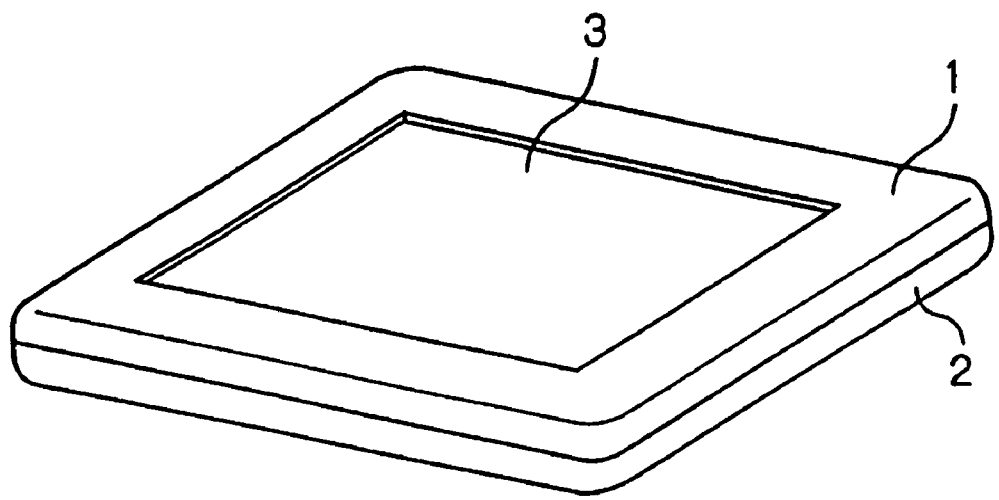
FIG. 1A is a perspective view illustrating the appearance of a portable electronic device according to a first embodiment of the present invention.
Figure 1B:
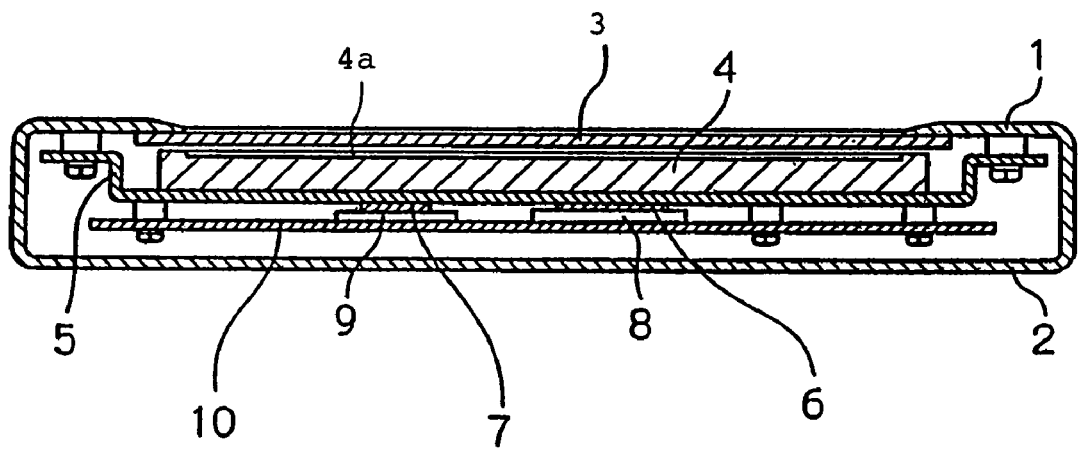
FIG. 1B is a cross-sectional view of the portable electronic device illustrated in FIG. 1A.
Figure 1C:
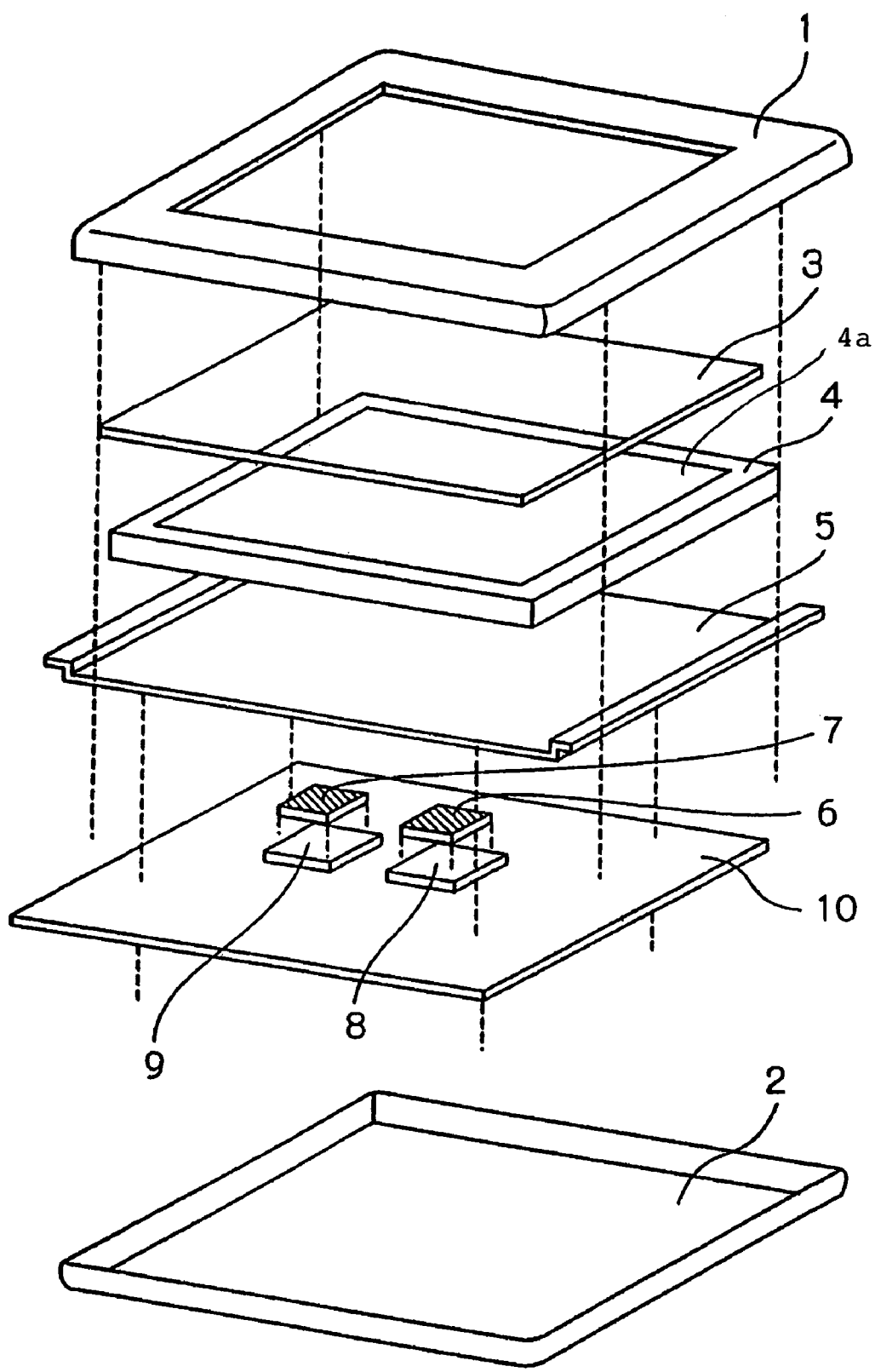
FIG. 1C is an exploded perspective view of the portable electronic device illustrated in FIG. 1A.

FIGS. 1A to 1C illustrate a portable electronic device according to a first embodiment of the present invention. Referring to these figures, the portable electronic device of this embodiment has LCD (liquid crystal display) 4 as a display device. Since this portable electronic device is operated by a user while the user is viewing this LCD 4, the device is normally used, as illustrated in FIG. 1A, with display panel 4a of LCD 4, which defines an image display plane, oriented upward. For convenience of description, in following explanation, the terms "upward" and "downward" correspond to the normal state of use of the device.

The portable electronic device of this embodiment is surrounded by a housing comprised of upper housing half 1 and lower housing half 2. Upper housing half 1 is formed with an opening for exposing display panel 4a of LCD 4 therethrough. More precisely, in this embodiment, touch panel 3 is disposed on LCD 4, so that it is touch panel 3 which is directly exposed through the opening of upper housing half 1. Touch panel 3 is transparent such that the user can recognize images, as a matter of course, this means that display panel 5a of LCD 4 is indirectly exposed through the opening of upper housing half 1. In LCD 4, at least display panel 4a is formed of glass, and touch panel 3 also has at least an upper surface made of glass, which is located on an image display plane of LCD 4.

LCD 4 and touch panel 3 are fixed to upper housing half 1 by LCD fixing frame (display device fixing frame) 5 which is in contact with a lower surface of LCD 4 and secured to upper housing half 1. The lower surface of LCD 4 is substantially flat, and LCD fixing frame 5 has a flat plate part which is in contact with the entire lower surface of LCD 4. LCD fixing frame 5 is made of a metal having a high thermal conductivity. From the perspective of reducing device weight, a suitable metal would preferably be a magnesium alloy or an aluminum alloy, but copper may be used instead.

Substrate 10 is attached below LCD fixing frame 5. Substrate 10 is mounted with circuits for performing various calculations required by various functions of the electronic device, processing input signals from touch panel 3, and performing processing involved in displaying images on LCD 4. In particular, high heat generation parts 8, 9, such as CPU, LSI or the like as elements, which form part of the foregoing circuits, are mounted on substrate 10, and at least high heat generating parts 8, 9 are mounted on the upper surface of substrate 10. Thermally conductive members 6, 7 are arranged on high heat generating parts 8, 9, respectively, and these thermally conductive members 6, 7 are in contact with the lower surface of LCD fixing frame 5. Thermally conductive members 6, 7 are made of a material having a high thermal conductivity such as silicone, and can therefore conduct heat generated by high heat generating parts 8, 9 to LCD fixing frame 5 in an efficient manner. The lower surface of substrate 10 is spaced apart from lower housing half 2 by a certain distance, so that heat generated at substrate 10 does not conduct directly to lower housing half 2.

A heat radiating operation will be described below when the portable electronic device of this embodiment is in use.

Heat generated from high heat generating parts 8, 9 mounted on substrate 10 during use of the portable electronic device of this embodiment is conducted to LCD fixing frame 5 through thermally conductive members 6, 7. Since LCD fixing frame 5 is made of a metal having a high thermal conductivity as mentioned above, the conducted heat is distributed over entire LCD fixing frame 5. Then, since LCD fixing frame 5 is in contact with the entire lower surface of LCD 4, the heat is almost uniformly conducted from LCD fixing frame 5 to the entire lower surface of LCD 4. Uniform heat conduction over the entire lower surface of LCD 4 makes it possible to reduce variations in temperature and resulting thermal influence on LCD 4. Also, the heat conduction efficiency from LCD fixing frame 5 to LCD 4 can be improved by first distributing the heat over the entire lower surface of LCD 4, which occupies a relatively wide area in the device, and then uniformly conducting the heat to LCD 4.

The heat conducted to LCD 4 is again conducted to display panel 4a and further to touch panel 3 above display panel 4a. Eventually, the heat is radiated to the outside of the device through emission from display panel 4a of LCD 4 and the surface of touch panel 3 on display panel 4a. In this event, display panel 4a of LCD 4 and the surface of touch panel 3 on display panel 4a are made of glass, as mentioned above, which has a higher thermal emissivity than plastic materials and the like, so that the heat can be efficiently radiated through emission.

In the portable electronic device of this embodiment described above, heat generated by high heat generating parts 8, 9 is conducted through LCD fixing frame 5 located above these high heat generating parts 8, 9 during a normal use of the electronic device and is further conducted to LCD 4 and touch panel 3 located above LCD fixing frame 5, which in turn radiate the heat. Since heat tends to naturally rise, heat is efficiently conducted by such a structure which conducts it upward.

Further, since display panel 4a of LCD 4 typically occupies a wide area on the top surface of the portable electronic device, more efficient heat radiation can be accomplished by radiating heat from display panel 4a of LCD 4. Then, heat from high heat generating parts 8, 9 is efficiently conducted to LCD 4 and touch panel 3, and efficiently radiated therefrom, so that the heat generated by high heat generating parts 8, 9 can be efficiently dissipated to the outside of the device as a whole which largely inhibits the temperature of high heat generating parts 8, 9 and the temperature within the device from reaching a high level.

In the structure of this embodiment, parts inherently required for the device, such as LCD fixing frame 5, LCD 4, touch panel 3, and the like are employed for dissipating heat generated by high heat generating parts 8, 9, and parts dedicated to the dissipation of heat are only thermally conductive members 6, 7 which are placed in a small space between high heat generating parts 8, 9 and LCD fixing frame 5. Consequently, the portable electronic device of this embodiment can efficiently dissipate heat while limiting an increase in the size and weight of the device. Also, since the dissipation of heat does not require an additional device which consumes electric power, power consumption is not increased as well.

Also, display panel 4a, which serves as a heat radiator in the portable electronic device of this embodiment, is generally required by the user to confirm display of an image while the user is using the device, thereby no object will be placed on display panel 4a. Further, the portable electronic device of this embodiment is configured to efficiently conduct heat generated at substrate 10, particularly at high heat generating parts 8, 9 mounted thereon to LCD 4 and touch panel 4, and can therefore inhibit heat from being conducted to upper housing half 1 and lower housing half 2 and inhibit them from being heated. Thus, even when the device is placed on a desk for operation, the heat radiation structure of this embodiment can reduce heat trapped between the desk and device, which would otherwise heat the device to a high temperature. In case where the user touches the housing, almost no low temperature burns will be received, no matter how long the device is held, because the housing does not become heated to a high temperature. On the other hand, while the portable electronic device of this embodiment is configured to conduct heat to touch panel 3, the user typically touches touch panel 3 only for a short period of time during operations and will not keep fingers continuously in contact with touch panel 3 for a long period of time, so that the user will not suffer from low temperature burns or the like due to touching the panel.

While the description of this embodiment omits detailed functions and the like of the electronic device, the present invention can be applied to any electronic device which has a display device that comprises a display panel such as LCD. As described above, since the heat radiation structure of this embodiment ensures high heat radiation performance, without causing an increase in size, weight and power consumption of the device, this structure is particularly suitable for small and potable electronic devices such as a notebook-type personal computer, a portable information terminal, a portable telephone, an electronic organizer and the like. Also, the heat radiation structure of this embodiment is effective for a stationary electronic device such as a desk-top personal computer, particularly in those cases when it is difficult to provide an effective heat radiating part for the computer with a housing or the like.

In regard to LCD fixing frame 5, while the foregoing embodiment has shown LCD fixing frame 5 to be of a shape which includes a rectangular flat plate part that is brought into full contact with the rectangular flat lower surface of LCD 4, LCD fixing frame 5 is not limited to such a shape. The shape of LCD fixing frame 5 is preferably selected such that heat is uniformly conducted to entire LCD 4 as appropriate in accordance with the shape and configuration of LCD 4, the layout of high heat generating parts, and the like, in such a manner that LCD 4 is not thermally affected very much by a temperature difference.

It should be understood that details in the configuration such as the number, shape, layout and the like of the display device and high heat generating parts are not limited to those illustrated in the figures, but can be modified in various manners without departing from the scope of the invention. Also, while high heat generating parts 8, 9 may be directly brought into contact with LCD fixing frame 5, thermally conductive members 6, 7 can facilitate designing a structure in which heat generated by high heat generating parts of various sizes and shapes can be efficiently conducted to LCD fixing frame 5. Also, thermally conductive members 6, 7 can prevent short-circuiting between high heat generating parts 8, 9 and LCD fixing frame 5, in particular when high heat generating parts 8, 9 are not packaged.

Figure 2:
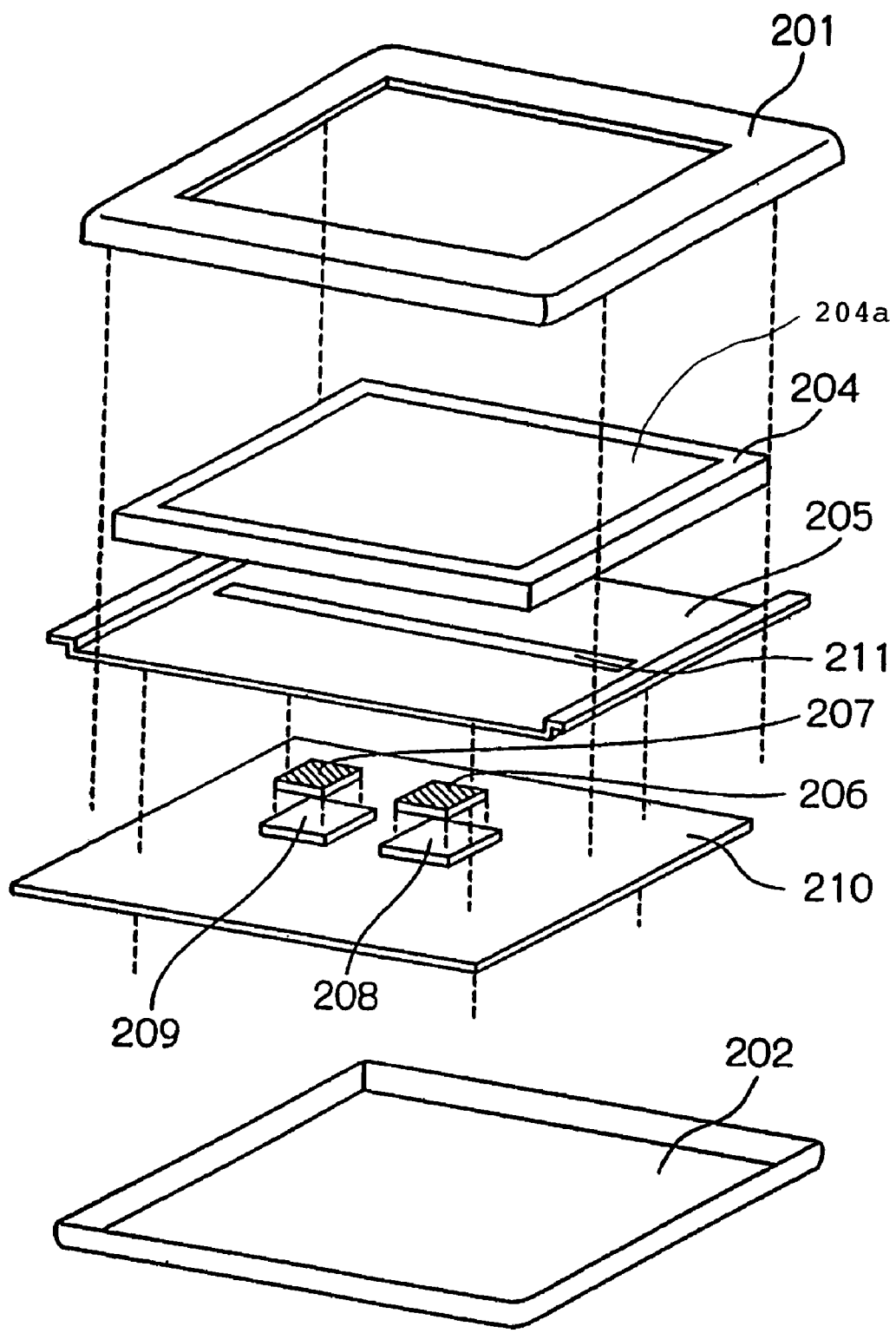
FIG. 2 is an exploded perspective view of a portable electronic device according to a second embodiment of the present invention.
Figure 3:
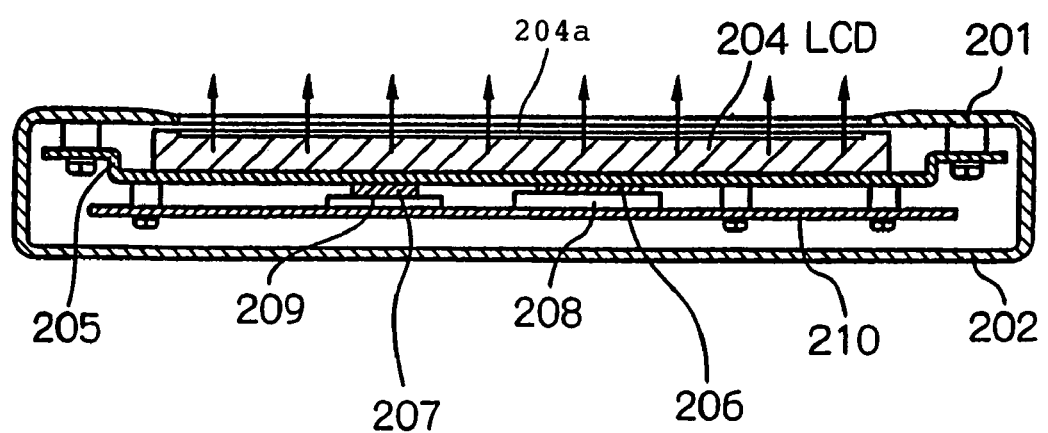
FIG. 3 is a cross-sectional view of the portable electronic device illustrated in FIG. 2.

Next, a portable electronic device according to a second embodiment of the present invention will be described in detail with reference to FIGS. 2, 3. Referring to these figures, the portable electronic device of the second embodiment is similar to the first embodiment in that LCD 204 is fixed to upper housing half 201 by LCD fixing frame 205, and substrate 210 mounted with high heat generating parts 208, 209 on the upper surface thereof is secured below LCD fixing frame 205. The second embodiment is also similar to the first embodiment in that thermally conductive members 206, 207 are disposed such that one surface of each member 206, 207 is in contact with high heat generating part 208, 209 and the other surface of each member 206, 207 is in contact with LCD fixing frame 205 in order to efficiently conduct heat generated by high heat generating parts 208, 209 to LCD fixing frame 205, and in that substrate 210 is spaced apart from lower housing half 202 to a certain extent in order to reduce heat which dissipates toward lower housing half 202.

In the second embodiment, in addition to LCD fixing frame 205 made of a metal having high heat conductivity as in the first embodiment, heat pipe 211, extending in a direction along the lower surface of LCD 204, is attached to the flat plate part of LCD fixing frame 205 which is in contact with the lower surface of LCD 204. In other words, this heat pipe 211 increases the thermal conductivity of LCD fixing frame 205 in the direction along the lower surface of LCD 204. As a result, heat conducted from high heat generating parts 208, 209 to LCD fixing frame 205 is rapidly distributed in the direction along the lower surface of LCD 205 to increase the uniformity of the heat within the lower surface of LCD 204 which is conducted to this lower surface, thereby making it possible to reduce thermal influence caused by a temperature difference developed within LCD 204.

Also, in the second embodiment, no touch panel is placed on LCD 204, but display panel 204a of LCD 204 is made of glass, like that of the first embodiment, so that heat conducted to display panel 204a is efficiently radiated to the outside of the device through emission. In this event, since the absence of a touch panel causes display panel 204a of LCD 204 to directly face the outside, heat radiation can be accomplished in a more efficient manner. On the other hand, though not shown, a protection panel may be placed on display panel 204 of LCD 204 in contact therewith. In this case, by making the protection panel of glass, heat conducted to the protection panel can be efficiently radiated to the outside of the device and sufficiently high heat radiation performance can be obtained as a whole.

Likewise, in the heat radiation structure of the second embodiment as described above, heat generated by high heat generating parts 208, 209 is efficiently conducted to LCD fixing frame 205 by thermally conductive members 206, 207, distributed in the direction along the lower surface of LCD 204 at LCD fixing frame 205 so that it is almost uniformly conducted to the lower surface of LCD 204, and radiated from display panel 204*a* of LCD 204 to the outside of the device. In this event, efficient thermal conduction can be accomplished because heat is conducted upward from high heat generating parts 208, 209 which are the sources of the heat, and efficient heat radiation can be accomplished by radiating the heat from display panel 204*a* of LCD 204 which occupies a wide area of the upper surface of the device, thus it is possible to efficiently dissipate the heat generated in the device to the outside of the device, as a whole. Also, since the portable electronic device of the second embodiment is not provided with a touch panel, the user need not touch display panel 204 of LCD 204, which serves as a heat radiating portion in the heat radiation structure of the second embodiment. In regard to the housing which can be touched by the user or which can be held in contact with a desk or the like, the housing can be inhibited from heating, as is the case with the first embodiment, thus almost eliminating such problems as low temperature burns to the user, and device having high temperatures due to heat trapped between the device and the desk.

While preferred embodiments of the present invention have been described using specific terms, such description is for illustrative purposes only, and it is to be understood that changes and variations may be made without departing from the spirit or scope of the following claims.

What is claimed is:

1. An electronic device comprising:
   a display panel having a front display surface and a rear surface;
   a housing formed with an opening for exposing said display panel therethrough;
   a heat generating part generating heat when said part operates;
   a heat conducting assembly for conducting the heat generated by said heat generating part to said display panel, the heat conducting assembly comprising a display device fixing frame for mounting the display panel to the housing, the display device fixing frame being in the shape of a plate part defined by first and second opposite surfaces, wherein at least a portion of the first surface on the display device fixing frame is in contact with a rear surface on the display panel;
   a substrate mounted to the display device fixing frame,
   wherein the heat generating part is positioned between the substrate and the display device fixing frame.

2. The electronic device according to claim 1, wherein said display panel is made of glass.

3. The electronic device according to claim 1, wherein said heat conducting assembly further includes a thermally conductive member disposed between said heat generating part and said display device fixing frame and being in contact with said heat generating part and said display device fixing frame.

4. The electronic device according to claim 1, wherein said substrate is spaced apart from said housing.

5. The electronic device according to claim 1, wherein said first surface of the display device fixing frame includes a flat part which is in contact with substantially all of a rear surface of said display panel.

6. The electronic device according to claim 1, wherein said heat conducting assembly further includes a heat pipe attached to said display device fixing frame and extending in a direction along the first surface of said display device fixing frame.

7. The electronic device according to claim 1, wherein at least a portion of the heat conducting assembly is in contact with substantially an entire surface of the high heat generating part.

8. The electronic device according to claim 3, wherein the thermally conductive member is in contact with substantially an entire surface of the heat generating part.

9. An electronic device comprising:
   a housing formed with an opening;
   a display panel having a display surface at least partially exposed through the opening in the housing, the display panel having a rear surface;
   a supporting frame mounting the display panel inside the housing;
   a heat generating part generating heat during operation;
   a thermally conductive member positioned between the supporting frame and the heat generate part;
   a substrate mounted to the supporting frame,
   wherein the thermally conductive member is in contact with substantially an entire surface of the heat generating part, and
   wherein the heat generating part is positioned between the substrate and the supporting frame.

* * * * *